T. J. Shears.
Carriage-Spring.
№ 83,217.  Patented Oct. 20, 1868.
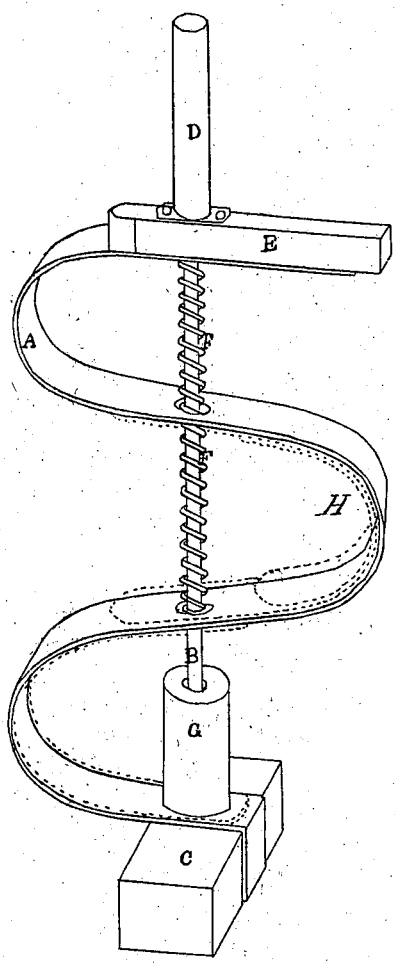
Attest
L C Hyan
Geo Seward
Inventor
T. J. Shears
per Attorney
Thos. S. Sprague

United States Patent Office.

THOMAS J. SHEARS, OF YPSILANTI, MICHIGAN.

Letters Patent No. 83,217, dated October 20, 1868.

IMPROVEMENT IN CARRIAGE-SPRING.

The Schedule referred to in these Letters Patent and making part of the same.

*To whom it may concern:*

Be it known that I, THOMAS J. SHEARS, of Ypsilanti, in the county of Washtenaw, and State of Michigan, have invented a new and useful Improvement in Wagon-Springs; and I do declare that the following is a true and accurate description thereof, reference being had to the accompanying drawings, and to the letters of reference marked thereon, and being a part of this specification.

The object of this invention is to construct a cheap, elastic, and durable spring, for use under all kinds of vehicles where springs are required, and which may be attached to the axle longitudinally or transversely, as may be most desirable.

In constructing this spring, I take a proper piece of steel, A, which I bend into the form of a triple c-spring, as shown in the drawings, and provided with a stem, B, the lower end of which should rest upon the axle C, or be rigidly attached to the lower side of said spring, thence passing upwards through proper slots in the springs, and in the position shown, through the top of the spring, where it may be surmounted with a proper cap, D, which should be rigidly fastened to the rail, E, of a wagon. Between the bends of the springs, in order to strengthen them, and surrounding said stem, I place the coiled wire, springs F, or the rubber springs G. Still further to strengthen this spring, when desired, leaves of subsidiary springs, H, of any suitable lengths may be added in the bends, or continued around said bends the whole of the length of the spring first described.

These assisting leaves may be secured in place by any appropriate device.

What I claim as my invention, and desire to secure by Letters Patent, is—

The combination of the springs in the form described, composed of the coil-springs F, or rubber springs G, with the subsidiary springs H, when arranged substantially as herein described.

THOMAS J. SHEARS.

Witnesses:
L. C. HYDE,
GEO. SUVAD.